United States Patent [19]

Keim

[11] 4,289,469

[45] Sep. 15, 1981

[54] APPARATUS FOR FORMING AND TRIMMING ARTICLES FROM A WEB

[75] Inventor: Karl H. Keim, South Portland, Me.

[73] Assignee: Gloucester Engineering Co., Inc., Gloucester, Mass.

[21] Appl. No.: 150,310

[22] Filed: May 16, 1980

[51] Int. Cl.³ .............................................. B29C 17/04
[52] U.S. Cl. ................................................. 425/302.1
[58] Field of Search ............................. 425/302.1, 394

[56] References Cited

U.S. PATENT DOCUMENTS

| | | |
|---|---|---|
| 2,874,775 | 2/1959 | Muller . |
| 2,944,456 | 7/1960 | Christiansen et al. . |
| 3,100,637 | 8/1963 | Brown . |
| 3,128,660 | 4/1964 | Gaubert . |
| 3,216,491 | 11/1965 | Brown et al. . |
| 3,228,066 | 1/1966 | Rippstein . |
| 3,359,600 | 12/1967 | O'Brien et al. .................... 425/302.1 |
| 3,464,299 | 9/1969 | Gagnou . |
| 3,632,250 | 1/1972 | Snow . |
| 3,659,993 | 5/1972 | Brown ............................. 425/394 X |
| 3,702,747 | 11/1972 | Porter et al. . |
| 3,785,762 | 1/1974 | Butzko . |

Primary Examiner—J. Howard Flint, Jr.

[57] ABSTRACT

Apparatus for forming and trimming articles from a web, featuring two conveyors, the first conveyor moving the web through the forming press and into a trimming station, the second conveyor moving the web within the trimming station. The two conveyors move in unison to transport a newly-formed section of web into the trimming station; a shear located between the conveyors severs the web; and, without loss of registration, the second conveyor moves the severed section of web past a trimming die, which cuts articles from a fraction of the severed section during each cycle.

13 Claims, 1 Drawing Figure

U.S. Patent   Sep. 15, 1981   4,289,469
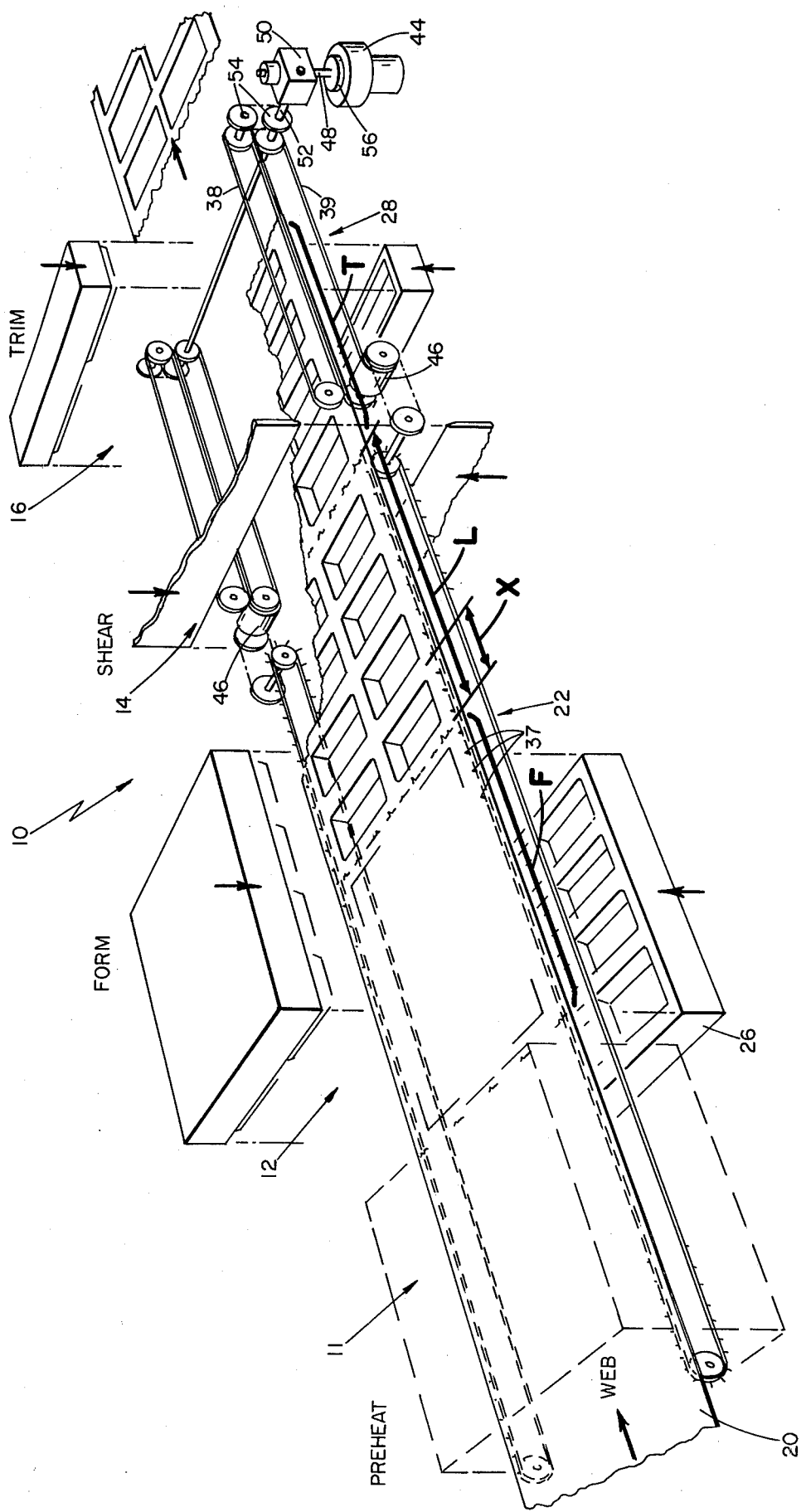

APPARATUS FOR FORMING AND TRIMMING ARTICLES FROM A WEB

FIELD OF THE INVENTION

This invention relates to apparatus for forming and trimming articles from a web.

BACKGROUND OF THE INVENTION

To increase production rates of thermoformed articles, it is conventional to provide a forming press capable of forming a plurality of articles in a single press cycle. The formed web with its plurality of articles is then moved to a trimming press where the articles are cut from the surrounding web. Proper registration of the trimming press with the formed web is desirable to prevent cutting errors. Registration is conventionally achieved by moving the web from the forming press to a trimming station while securely held in a conveyor. A trimming press with a die as large as the forming tool then cuts the articles from the web, which is all the while held in the same conveyor. In situations in which trimming accuracy is less critical, the formed section of web is conveyed, without maintaining registration, to a separate trimmer where a small trimming die cuts the articles from the web in a succession of cutting strokes.

SUMMARY OF THE INVENTION

I have found a means of achieving accurate trimming while using a trimming die smaller than the forming tool. Two conveyors are provided: the first conveyor moves the web through the forming press and into a trimming station; the second conveyor moves the web within the trimming station. The two conveyors move in unison to transport a newly-formed section of web into the trimming station; a shear located between the conveyors severs the web; and, without loss of registration, the second conveyor moves the severed section of web past a trimming die, which cuts articles from a fraction of the severed section during each cycle.

In preferred embodiments, a clutch is provided for advancing the first and second conveyors in unison and then the second conveyor alone; spikes are provided on the first conveyor for engaging portions of the web; upper and lower chain elements grip the web on the second conveyor; the trimming press trims the most downstream unit length of articles first; a shaft encoder, position sensors, and control means operate hydraulic cylinders to move the forming press, shear, and trimming press; the trimming press trims a single row of the plurality of rows of articles formed in one forming cycle by the forming press; and the trimming press trims the first unit length of web at the same time as the shear severs the web.

PREFERRED EMBODIMENT

The structure and operation of a preferred embodiment of the invention will now be described.

Turning to the FIGURE, which is a perspective view, partially broken away, of said preferred embodiment, there is shown thermoforming apparatus 10, comprised of preheating oven 11, forming station F, shear 14, and trimming station T, for producing articles such as meat trays from a continuous web 20 of thermoformable material (e.g., polystyrene foam, high impact polystyrene, or polyurethane).

Web 20 is gripped by a first conveyor 22 and advanced through oven 11, where it is heated to a temperature suitable for thermoforming, and into forming press 26, where the web is formed into an array of identical articles.

The array shown comprises four rows of two articles and occupies a length L of the web with the rows spaced apart by unit length X. Web 20 is periodically advanced, typically 22 to 35 times a minute, by the length L to bring new portions of the web into the forming station. With each advance of web 20, the portion of the web containing the formed array is advanced under shear 14 and into trimming station T, where it is gripped by a second conveyor 28. Conveyor 28 grips the web as it passes from conveyor 22, and advances synchronously with conveyor 22 to advance the web into the trimming station.

Conveyor 22 is fitted with a number of spikes 37 which pierce and thereby engage and advance web 20. Conveyor 28, on the other hand, has upper and lower chains 38, 39 which press against the upper and lower surfaces of web 20 in the same area where the web was pierced. Use of upper and lower chains 38, 39 prevents loss of registration such as might occur if conveyor 28 employed spikes. Spikes on conveyor 28, might pierce the web 20 so close to the holes produced by the spikes of first conveyor 22 that the web could be weakened sufficiently so as to tear between the spike holes, thus resulting in loss of registration.

After the web has been advanced by distance L, shear 14 operates to cut the web along line S, thus separating the portion of the web within the trimming station from the continuous portion of the web in the forming station. Trimming press 16 operates at the same time as the shear, to trim the first row of cups from the severed portion of the web at the same time as the shear separates the portion of the web in the trimming press from that in the forming press. Thereafter, the severed portion of the web in the trimming press is periodically advanced (typically 60 to 120 times a minute), by the distance X to bring successive rows of cups under the punch and die set where they are cut from the web.

The forming and trimming presses and the shear are controlled by drive 44, which drives conveyor 28, and clutches 46, which couple conveyor 28 to conveyor 22. In the first advance of the web, from the forming to the trimming station, conveyors 22 and 28 are coupled together through clutch 46 so that both conveyors, and the web, are advanced by distance L by driver 44. After the portion of web to be trimmed has been severed from the remainder of the web, the clutch disengages the conveyors so that the severed portion can be advanced only the incremental distance between rows (i.e., distance X). Driver 44 is a D.C. electric motor. Its output shaft 48 is engaged with a gear reduction unit 50, preferably having a 5 to 1 ratio, whose output shaft 52 is, in turn, coupled with drive sprockets 54 of conveyor 28.

The forming press 26, shear 14 and trim press 36 are all provided with proximity switches which send electric impulses to tell a central control unit (not shown) when each of the units reside at their extreme limits of travel.

This control unit (which may be a microprocessor, a set of relays, or a solid state control unit such as an Allen-Bradley "cardloc" unit) is also in electrical communication with the electric clutch 46, the electric drive motor 44 and an optical shaft encoder 56 of either 512 or 1024 bits, mounted directly on the electric drive motor output shaft 48.

The forming press 26, shear 14 and trimming press 36 are all hydraulically activated by electrically activated hydraulic valves (not shown) and hydraulic cylinders. The speed of operation of each of the separate pieces of hydraulic machinery may be independently controlled by varying the pressure head of the hydraulic fluid associated with each of the hydraulic machines. For example, forming press 26 may be set to run at a speed dictated by the properties of the material being formed, by varying the pressure head of its associated hydraulic fluid. By varying the pressure heads of their respective hydraulic fluids, the shear 14 and trimming press 36 may then be set to run at speeds such that all rows of a web section of length L will have been trimmed by the time that the forming press 26 ascends to its uppermost position.

As the control unit and proximity switches function in combination to insure that operational events are carried out in the proper sequence, while the hydraulic control system provides means for varying the rate of travel of each separate hydraulic machine independently, it can be seen that the two control systems acting in combination allow for maximum flexibility and efficiency in overall operation.

At the beginning of an operational cycle, with a section of web 20 of length L having been formed by pressure exerted by the forming press 26 and with the forming press in its uppermost position, the control unit sends an electric signal to the electric clutch 46, causing it to engage so that any rotation of the electric drive motor output shaft 48 will cause equal movements of both conveyor 28 and conveyor 22. At the same time as the control unit engages the electric clutches 46, it also sends an electric signal activating the electric drive motor 44 thereby causing rotation of the electric drive motor output shaft 48 and a corresponding movement of both conveyors 22, 28, now mechanically linked through electric clutches 46.

As conveyor 22 advances it causes the newly formed section of web 20 of length L (with which it engages by means of spikes 37) to move from its position within the forming station F and enter the trimming station T, whereupon the newly formed web is engaged by the upper and lower chains 38, 39 of conveyor 28 and is thereby, through their movement further advanced within trimming station 16. Movement of conveyor 22 also causes an unheated section of web 20 to advance into oven 24 and a heated section of web 20 to advance into forming station 12.

As the electric drive motor output shaft 48 rotates, the optical shaft encoder 56 begins registering bits, corresponding to the degree of relative rotation of the electric drive motor output shaft 48, and sends electric signals to the control unit. When the appropriate number of bits have been registered to advance both conveyors 22, 28 and the web material with which they engage by the predetermined distance L, the control units sends an electric signal which deactivates the electric drive motor 44. This position is shown in FIG. 5.

At the same time that the control unit deactivates the electric drive motor 44, it also sends an electric signal to the electric clutchs 46 causing them to disengage, so that any rotation of the electric motor output shaft 48 will cause movement of only conveyor 28 and the formed material which it engages within the trimming press, while conveyor 22 and the web being formed in the form press remain stationary.

At the same time, the control unit also sends electrical signals to activate hydraulic valves to cause the forming press 26, the shear 14 and the trimming press 36 to begin movement towards the web.

Each time the forming press 26 reaches its lowermost position of travel, it activates a proximity switch causing an electric signal to be sent to the control unit, indicating such condition. At this point the forming press enters a hold phase, with the hold time being electrically timed by the control unit.

In the meantime, the shear 14 and the trimming press will have reached their bottommost limit of travel, and at that time the proximity switches associated with these positions send electric signals to the control unit, which, in turn, then sends signals to the electrically actuated hydraulic valves responsible for raising both the shear 14 and the trimming press 36, whereby they begin upward travel.

At this point the action of the shear 14 has severed the section of web 20 within the trimming station from the remainder of web 20, and the action of the trimming press 36 has transformed the most downstream row of the formed section of web 20 into a number of individual discrete articles.

With the forming press 26 still in the hold phase, the shear 14 and the trimming press 36 reach their uppermost positions and activate two proximity switches, causing the control unit to activate the electric drive motor 44. Rotation of the electric drive motor output shaft 48 causes conveyor 28 to transport the formed web material within the trimming station T in a downstream direction. The optical shaft encoder 56 then registers bits, corresponding to degrees of relative rotation of the electric drive motor output shaft 48, and relays this information to the control unit. When a sufficient number of bits have been registered such that the formed web within the trim station will have been advanced in the downstream direction by the predetermined distance X, the control unit then deactivates the electric drive motor 44 and activates the appropriate hydraulic valve to initiate discent of the trimming press 36, the shear 14 remaining stationary.

Upon reaching its bottommost position the trimming press 36 performs the desired work on the second row of the formed web and activates proximity switch so that the control unit will cause the trimming press 36 to ascend. At this point a second set of individual discrete articles will have been produced and the formed web within the trimming station T will have been advanced by a distance X, as shown in FIG. 6.

The suboperation of trimming, incrementally advancing the formed web by a distance X, and trimming again is repeated as many times as there are rows within each formed section of length L. The trimming operation is carried out while the forming press 26 is in its hold cycle, the trimming operation terminating coterminously or before the end of the hold phase of the forming press 26.

All rows having been trimmed and the hold phase having come to an end, the forming press 26 and the trimming press 36 ascend and reach their uppermost positions. At this time one operational cycle has been completed.

Oven 24 and forming press 26 are supported on rails (not shown) so as to be movable along the longitudinal axis of machine 10, so that the distance between the forming press and the cutting line of shear 14 can be adjusted. Trimming press 36 is likewise supported on rails so as to be adjustable along the axis of machine 10. The distance between the trimming press and the shear line is selected so that, after the web has been advanced distance L from the forming press into the trimming press, the first row of articles falls under a punch and die set on the trimming press.

Other Embodiments

Other embodiments of the invention are within the scope of the following claims. E.g., distance L need not be an integral multiple of distance X; driver 44 can be a hydraulic device; and an indexing motor, in the form of a 180° vane hydraulic motor, can be provided. The 180° vane hydraulic motor drives an arm which in turn drives a rack in a reciprocating manner, as disclosed in Schott, Jr., U.S. Pat. No. 3,748,078. The rack is permanently coupled to the pinion of a clutch, so as to drive the clutch alternatively in the clockwise and counter-clockwise directions. The clutch is alternatively engaged and disengaged to drive a shaft which in turn incrementally advances conveyor 28 in one direction, the conveyor advancing a distance X with each stroke of the arm, or a distance L with consecutive strokes of the arm.

Furthermore, clutches 46 need not be electric but can be hydraulic, and a single clutch, electric or hydraulic, can be employed rather than two.

What is claimed is:

1. In an article forming machine adapted to produce discrete articles from a continuous web of material, the machine comprising
   a forming press for forming the articles in the web,
   a trimming station including a press for trimming the articles from the web, and
   a web transport means for advancing the web past the forming and trimming presses,
   said forming press being constructed to form on each press cycle a plurality of articles arranged over a plurality of unit lengths in the direction of advance of the web, the improvement wherein,
   said web transport means comprises
   first conveyor means for advancing the web to said forming press and thence to said trimming station,
   second conveyor means for advancing the formed web through said trimming station,
   said first and second conveyor means including means for positively engaging the web so as to prevent longitudinal slippage of the web relative to said conveyor means,
   first drive means for driving said first and second conveyor means in unison to advance a section of formed web into said trimming station in such a manner that registry is maintained between said first and second conveyor means,
   severing means operable after said unison movement for severing the web at a location between said conveyor means to provide at said trimming station a severed section of said formed web made up of a plurality of said unit lengths, and
   second drive means for repetitively moving said severed section of web forward a single said unit length at a time within said trimming station while said first conveyor means is stationary,
   said trimming press includes die means extending over only one said unit length, said die means being operable, following each said unit-length movement of said second conveyor, to trim from said web those articles extending along said one unit length of said web.

2. The machine of claim 1 wherein said first and second drive means comprise a clutch for engaging said first and second conveyors to advance them in unison and for disengaging said conveyors to advance said second conveyor independently of said first conveyor.

3. The machine of claim 1 wherein said first conveyor comprises spikes for engaging peripheral portions of said web and said second conveyor comprises upper and lower chain elements for pressing tightly against said web which is captured between said elements.

4. The machine of claim 1 wherein said forming press is constructed to form an integral number of said unit lengths on each forming cycle.

5. The machine of claim 1 wherein said trimming press includes means for trimming the most downstream said unit length first and then the next upstream unit length until all said unit lengths are trimmed.

6. The machine of claim 1 wherein said forming press includes means for forming a plurality of rows of articles, each said row extending transversely across said conveyors and said unit length being equal to the length of one or more rows, and wherein said trimming press includes means for trimming, in each cutting cycle, all of the articles in one or more rows.

7. The machine of claim 1 wherein said trimming means includes means for trimming, after each forward movement of said first conveyor, the same number of articles as formed by said forming press in a single forming operation.

8. The machine of claim 1 wherein said first drive means comprises shaft encoding means for indicating the length by which said conveyors are moved.

9. The machine of claim 1 wherein said forming press includes means for thermoforming and said machine further comprises an oven for heating said web prior to forming.

10. The machine of claim 8 further comprising sensors for indicating the position of elements of said forming press, severing means, and trimming press, and further comprising control means responsive to said sensors for initiating movements of said first and second drive means and of said forming press, severing means, and trimming press.

11. The machine of claim 10 wherein said control means comprises electrically-actuated hydraulic valves and hydraulic cylinders activated by said valves for moving said forming press, shearing means, and trimming press.

12. The machine of claim 6 wherein said unit length is one said row of articles.

13. The machine of claim 1 wherein said trimming press trims articles from the first of said unit lengths at substantially the same time as said severing means severs said severed section of web from the portion of said web upstream of said trimming station.

* * * * *